(12) United States Patent  
Williams (10) Patent No.: US 7,627,525 B2  
(45) Date of Patent: Dec. 1, 2009

(54) AUTOMATED CHECK CASHING AND LOAN PROCESSING ATM SYSTEM AND METHODOLOGY

(76) Inventor: Andrew Williams, 12478 Masters Ridge Dr., Jacksonville, FL (US) 32225

( * ) Notice: Subject to any disclaimer, the term of this patent is extended or adjusted under 35 U.S.C. 154(b) by 258 days.

(21) Appl. No.: 11/465,462

(22) Filed: Aug. 18, 2006

(65) Prior Publication Data

US 2007/0080207 A1    Apr. 12, 2007

Related U.S. Application Data

(60) Provisional application No. 60/596,632, filed on Oct. 7, 2005.

(51) Int. Cl.  
*G06F 17/60* (2006.01)

(52) U.S. Cl. .............. 705/39; 705/35; 705/38; 705/40; 705/45; 717/171; 717/176; 717/200; 205/1; 205/5; 205/30

(58) Field of Classification Search ............... 705/1–80; 715/730–750; 270/1.01; 902/1–32  
See application file for complete search history.

(56) References Cited

U.S. PATENT DOCUMENTS 6,695,203 B2 *   2/2004   Iki et al. ................ 235/375

2002/0052826 A1 *   5/2002   Dines et al. ............... 705/37  
2004/0044606 A1 *   3/2004   Buttridge et al. ........... 705/35  
2004/0236688 A1 *   11/2004   Bozeman .................. 705/42

OTHER PUBLICATIONS

Co-op financial service staff, ATM Processing brochure, co-op, web, pp. 1-2.*

* cited by examiner

*Primary Examiner*—James P Trammell  
*Assistant Examiner*—Marissa Liu  
(74) *Attorney, Agent, or Firm*—Mark Young, P.A.

(57) ABSTRACT

Automated methods for processing a cash advance and/or a check cashing transaction using an ATM entail obtaining identification information for a user; producing an image of each side of an original check for the transaction; accessing a database of financial transactions to determine if the transaction has an unacceptable risk; voiding the original check and returning the voided check to the user; producing a cash (debit) card and corresponding account for a principal amount for the user; and communicating the image of each side of the original check to a settlement service provider via a communications network on a maturity date.

20 Claims, 4 Drawing Sheets

AUTOMATED CHECK CASHING AND LOAN PROCESSING ATM SYSTEM AND METHODOLOGY

RELATED APPLICATION

This application claims the benefit of priority of U.S. Provisional Application 60/596,632, filed Oct. 7, 2005, the entire contents of which are incorporated herein.

FIELD OF THE INVENTION

This invention generally relates to check cashing and loan processing, and more particularly, to an automated system and method for cashing checks and/or processing loans from a terminal, such as an automated teller machine (ATM) or a kiosk.

BACKGROUND

Many individuals, particularly low-wage earners, rely very heavily upon check cashing services to process their paychecks and cash advance services to manage their finances. Businesses that provide such services are an extremely valuable resource to consumers with limited liquidity and access to conventional banks. For millions of consumers, these services are a way of life. Consequently, the number of outlets offering these types of services has grown dramatically in recent years. People in need have turned such outlets into a kind of alternative banking sector.

While these outlets fill a void, they suffer several shortcomings. For example, such outlets are labor-intensive, susceptible to crime and typically relegated to low-income geographic areas. Although conventional ATMs are ubiquitous, such devices are not equipped to perform check cashing and loan operations. Concomitantly, despite the huge potential profits, retail banks have shied away from opening such outlets, because they believe it might tarnish their reputation. Ultimately, these realities harm consumers, because the limited supply of check cashing and loan outlets promotes higher transaction fees and deprives consumers of access to such services while traveling.

Individuals also face heightened safety and security risks by conducting financial transactions in cash. Carrying large amounts of cash is dangerous and keeping cash at home is not a whole lot safer. What is needed is a safe medium to keep money until a consumer is ready to spend it.

The invention is directed to overcoming one or more of the problems and solving one or more of the needs as set forth above.

SUMMARY OF THE INVENTION

As used herein, the term check is used to broadly cover any negotiable instrument instructing a financial institution to pay a specific amount from a specific account held in the maker/depositor's name with the institution.

To solve one or more of the problems set forth above, in an exemplary implementation of the invention, systems and methods for processing a cash advance and/or a check cashing transaction using an ATM entail obtaining identification information for a user; producing an image of each side of an original check for the transaction; accessing a database of financial transactions to determine if the transaction has an unacceptable risk; voiding the original check and returning the voided check to the user; producing a cash (debit) card and corresponding account for the user; and communicating the image of each side of the original check to a settlement service provider via a communications network on a payment date (i.e., "settlement date").

In one aspect of an exemplary implementation of the invention, a process for processing a cash advance transaction using an ATM is disclosed. The process entails obtaining identification information for a borrower. Then an image is produced of each side of an original check from the borrower to a service provider for a first amount. Next, a database of financial transactions is accessed to determine if the borrower has an unacceptable reported financial history. The original check is voided and returned to the borrower. A password-protected cash (debit) card and corresponding account for a second amount is established for the borrower. The second amount is less than the first amount. On the payment due date, the image of each side of the original check is communicated to a settlement service provider via a communications network.

In another aspect of an exemplary implementation of the invention, a process for processing a check cashing transaction using an ATM is disclosed. The process entails obtaining identification information for a payee. Then an image is produced of each side of an original check from a third party to the payee for a first amount. Next, a database of financial transactions is accessed to determine if the payee or third party has an unacceptable reported financial history. The original check is voided and returned to the payee. A password-protected cash (debit) card and corresponding account for a second amount is established for the payee. The second amount is less than the first amount. The image of each side of the original check is communicated to a settlement service provider via a communications network.

In yet another aspect of an exemplary implementation of the invention, an automated method for processing a check financial transaction (e.g., check cashing and/or loan processing) uses a computing system communicatively coupled to a computer network. The computing system includes a scanner. The exemplary method entails obtaining application information from a customer via the computing system; receiving an original check from the customer for payment of a first amount; producing check data from the original check using the scanner; accessing a creditworthiness database to obtain customer creditworthiness information and determine if the customer poses an unacceptable credit risk; communicating application information and customer creditworthiness information to an underwriting module configured to determine whether to approve the check financial transaction; voiding the original check (e.g., by perforating, mutilating, stamping, or printing a void indication on the check); in the case of a check cashing transaction, returning the voided original check to the customer; providing a principal amount to the customer, the principal amount being less than the first amount; and communicating the check data to a remote settlement system configured to settle the transaction.

The check data may be communicated to a remote settlement system configured to settle the transaction on a determined maturity date. The check data may include all data required for producing a substitute check, including data corresponding to a scanned image of each side of the original check, an account number for the original check, a routing transit number for the original check, an amount for the original check and a check number for the original check. The computing system includes a financial card supply and activation subsystem and the method may include a step of providing a principal amount to the customer includes opening an account for the principal amount, funding the account with the principal amount, producing a financial card for transacting with the account and providing the financial card to the customer via the computing system. The check data includes data corresponding to a scanned image of each side of the original check. The application information from the customer includes the customer's name, address, date of birth, phone number, credit card information, driver's license information, social security number, biometric information, and a photograph. Biometric information may be obtained using a biometric scanner. The computing system may be equipped with a camera and the application information includes a digital photograph of the customer, the digital photograph being produced by the computing system. The customer is presented with a legally binding agreement applicable to the transaction and required to accept it as a condition for proceeding with the transaction.

The method may further entail accessing a remote database to compare the application information obtained from the customer with information for the customer in the remote database. The step of accessing a creditworthiness database to obtain customer creditworthiness information and determine if the customer poses an unacceptable credit risk entails accessing a remote credit reporting database to obtain a credit score and/or accessing a check payment history database to determine if the customer has previously passed dishonored checks.

The check data is communicated to a financial institution for electronic disbursement of funds to a determined service provider account upon receipt of the check data by the financial institution. Settlement may occur on a determined maturity date. Settlement may be performed according to The Check Clearing for the 21st Century Act, United States Public Law 108-100, as amended or according to Automated Clearing House procedure.

The check data may comprise a file formatted according to a determined standard. The principal amount may be provided to the customer via an activated financial card (e.g., debit (cash) card) associated with an account at a depository institution that is funded with the principal amount. Alternatively, cash equal to the principal amount may be provided to the customer; or the principal amount may be transferred to an account specified by the customer.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the Figures are not intended to illustrate every implementation of the invention. Specifically, the invention is not limited to the exemplary implementations or order of steps depicted in the Figures.

DETAILED DESCRIPTION

Figure 1:
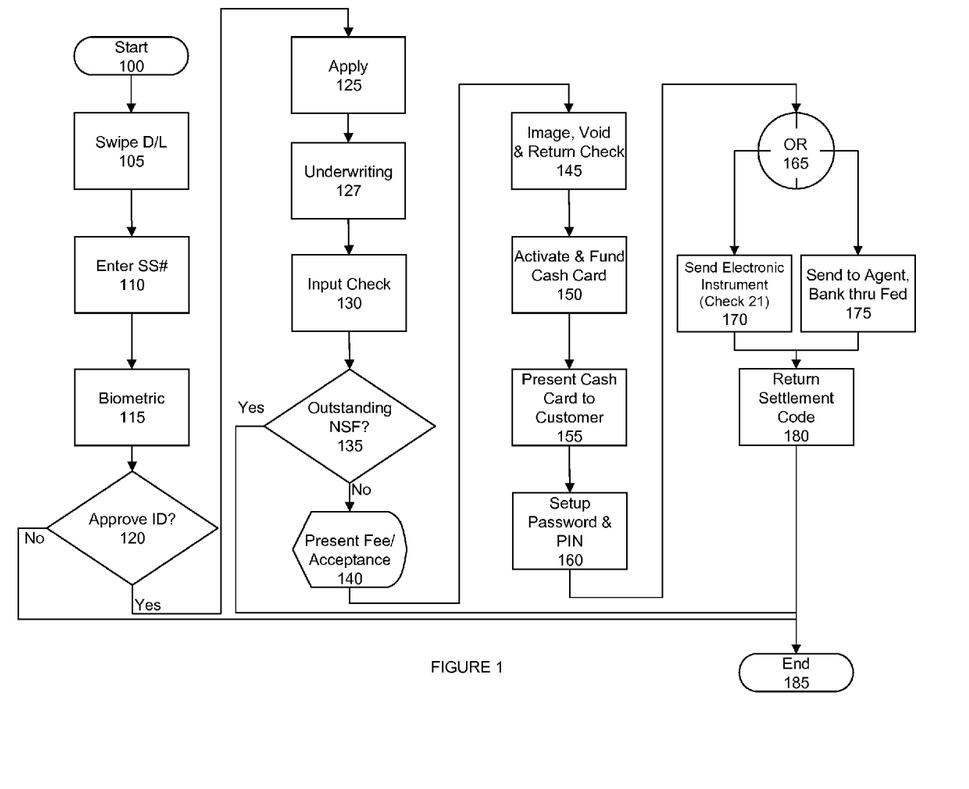
FIG. 1 provides a high level flowchart of an exemplary check cashing process according to principles of the invention.
Figure 2:
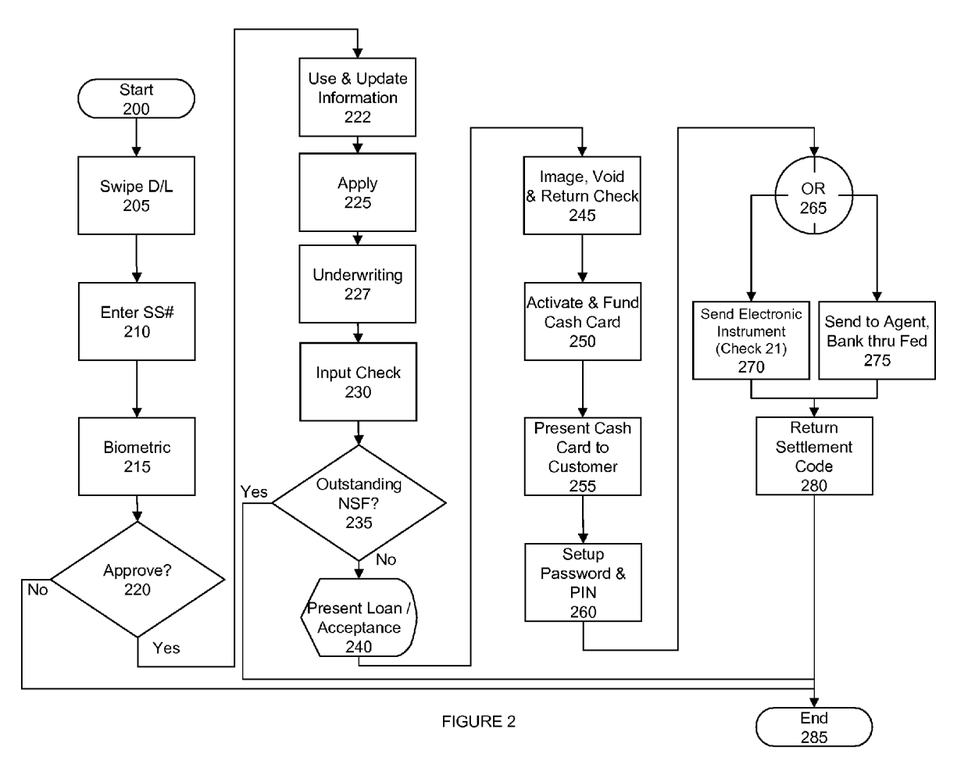
FIG. 2 provides a high level flowchart of an exemplary first cash advance process according to principles of the invention.
Figure 3:
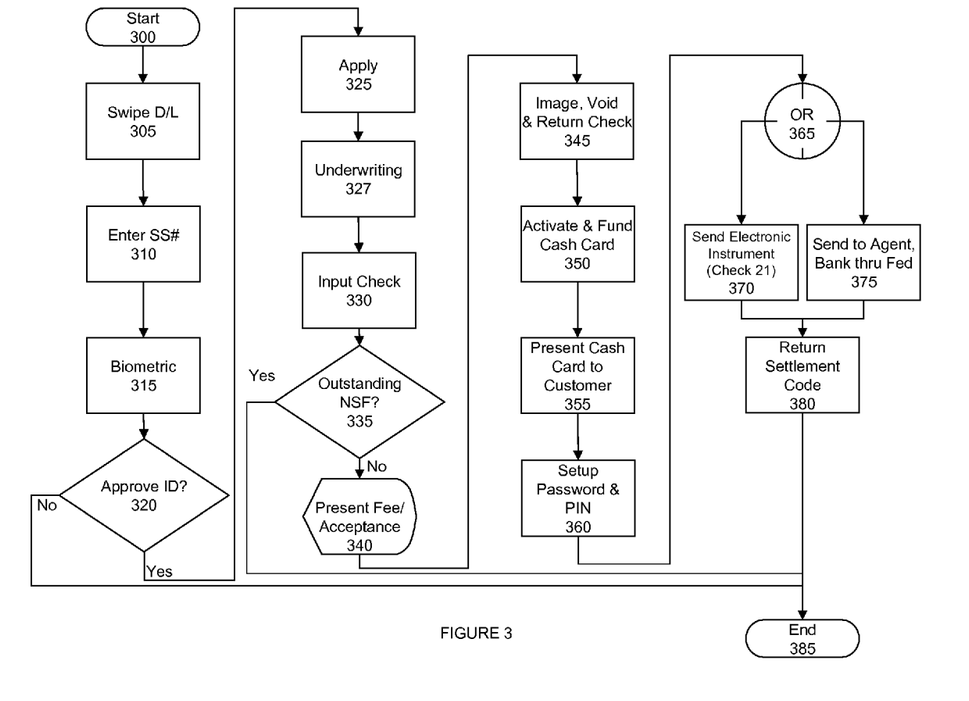
FIG. 3 provides a high level flowchart of an exemplary subsequent cash advance process according to principles of the invention.
Figure 4:
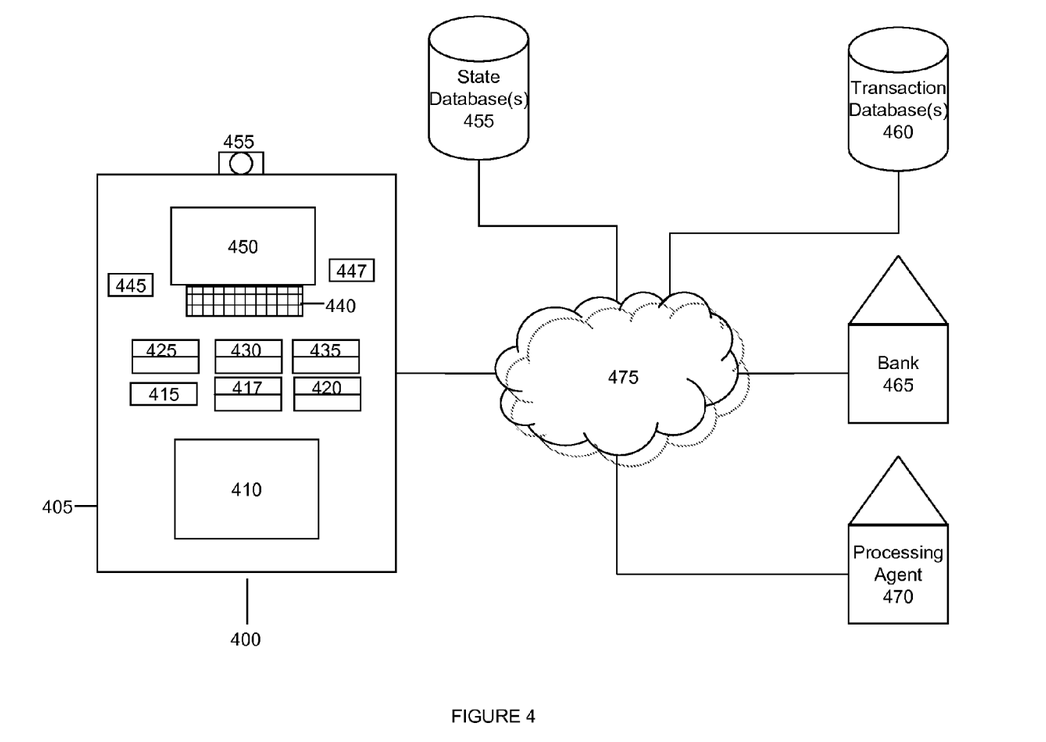
FIG. 4 provides a high-level block diagram of an exemplary ATM system for use in processing transactions according to principles of the invention.

In an exemplary implementation of the invention, the invention provides processes for cashing checks and processing cash advance transactions. Referring to FIGS. 1 through 3, high-level flowcharts of exemplary check cashing and cash advance processes according to principles of the invention are shown. Processes for cashing checks and processing cash advance transactions may be implemented utilizing automated teller machines or other self-service terminals, kiosks or computing equipment equipped for processing transactions according to principles of the invention. For purposes of convenience, such automated teller machines and other computing equipment, self-service terminals and kiosks that are now known or hereafter developed and that are configured to perform functions in accordance with principles of the invention are referred to collectively herein as ATMs. FIG. 4 provides a high-level block diagram of an exemplary ATM system for use in processing transactions according to principles of the invention.

Referring now to FIG. 4, an exemplary ATM 400 for use in processing transactions according to principles of the invention may include a housing 405 that may be opened by authorized persons using suitable locks; a display 450 and user input device, such as a touch sensitive screen and/or a display with a separate keyboard 440; a cash acceptor 425; a cash dispenser 415 coupled to bill transport and picker mechanisms configured to pick bills from one or more supplies of bills in the machine; a printer 417 configured to print receipts and agreements for purposes of documenting transactions conducted at the machine; a check acceptor 430 operably coupled to check imaging device configured to create images of both sides of a check; a card reader 435 adapted for reading magnetic stripe cards, smart cards or other information bearing cards; a card dispenser 420 adapted for dispensing cash value cards; a biometric input device 445; a signature pad 447; a camera 455 configured to photograph each user; and other hardware, firmware, software and peripherals configured to enable performance of processes in accordance with principles of the invention. The input and output devices discussed above are exemplary and in other embodiments other input and output devices such as retina scanners, voice recognition systems, voice input systems, audible output devices and other types of devices that receive inputs that are usable to identify a user and/or their accounts, or which can be operated to provide instructions to or from the machine, may be used. Additionally, certain of the devices may be combined. For example, a touch sensitive monitor with a stylus may be provided in lieu of the display 450, keypad 440 and signature pad 447.

The invention is not limited to the exemplary ATM 400 as depicted in FIG. 4. Rather, the ATM 400 is intended to represent a broad category of computing devices suitable for configuration to perform processes in accordance with the principles of the invention. ATMs having various other configurations may be utilized, so long as the ATMs enable performance of a process in accordance with the principles of the invention. Indeed, any computing systems communicatively coupled to a network and adapted to provide a user a secure method of communication to access accounts, perform financial (e.g., cash advance or loan) transactions in accordance with principles of the invention and check account balances without the need for a human service provider, may be utilized and come within the scope of the invention. Nonlimiting examples of such computing systems may include kiosks, PCs, mobile computing devices and point-of sale systems.

Thus, for example, in some embodiments, a checkout point-of-sale (POS) system in a retail establishment may be adapted to perform processes in accordance with principles of the invention. Using such a POS system, a check cashing transaction may be processed in accordance with principles of the invention, with some or all of the funds from the transaction being provided to the customer and/or being used to pay for goods or services purchased at the retail establishment.

A controller 410 operatively coupled with a data storage device or memory holds programming instructions, information about transactions, communication information and other data used in operation of the machine. The controller also controls operation of the various devices in accordance with the programmed instructions. A communications device operably coupled to the controller 410 enables the exemplary ATM 400 to communicate with at least one remote computer system, including a database, for purposes of carrying out transactions in accordance with principles of the invention.

As represented schematically in FIG. 4, ATM 400 is communicatively connected with one or more networks 475. An exemplary network 475 is an interbank network operatively connected with one or more databases 455 and 460 and computers at one or more financial institutions and/or processing agents 465 and 470. The ATM 400, networks 475, databases 455 and 460 and computers at one or more financial institutions and/or processing agents 465 and 470 are preferably adapted for secure and/or encrypted communication in a manner suitable for processing financial transactions. Of course, the communications approach depicted in FIG. 4 is exemplary, and in other embodiments other communications approaches, network configurations, databases, agents and/or financial service providers may be used without departing from the scope of the invention.

Optionally, an ATM 400 may display an initialization screen that requires a user to select a type of transaction, such as a check cashing or cash advance transaction. Of course, the ATM 400 may optionally be configured to perform conventional ATM operations (e.g., deposit and withdrawal operations) in addition to the check cashing and cash advance transactions. If a user selects a cash advance transaction, and it is the user's first cash advance through the system, then the exemplary process shown in FIG. 1 may be implemented. If a user selects a cash advance transaction, and the user has previously obtained a cash advance through the system, then the exemplary process shown in FIG. 2 may be implemented. If a user selects a check cashing transaction, then the exemplary check cashing process shown in FIG. 3 may be implemented.

Referring now to FIG. 1, a high-level flowchart of an exemplary cash advance process according to principles of the invention is shown. Cash advance transactions are short-term loans, generally referred to as deferred presentment transactions because the debtor provides the lender a check to cover the loan amount, accrued interest, applicable fees and taxes, and the lender agrees to refrain from cashing the check until an agreed upon date maturity date. The loan is typically given in cash and secured by the borrower's post-dated check that includes the original loan principal, accrued interest, applicable fees and taxes. On the maturity date the lender processes the check through electronic withdrawal from the borrower's checking account. Various state laws and regulations limit the amounts that can be loaned, the fees charged, the number of days that the check can be held and various other aspects of the transaction. By way of illustration and not limitation, to receive a $100 cash advance, a debtor may provide the lender a personal check for about $120 with the understanding that the lender will not cash the check until 7 to 31 days later (depending upon the applicable state law) to cover the cash advance (i.e., principal loan amount), fees and any applicable taxes. The lender will refrain from cashing or depositing the check until the agreed upon date.

In general, an exemplary cash advance process according to principles of the invention commences 100 with steps of obtaining identification information as in steps 105-115. By way of example and not limitation, the borrower's name, address, date of birth, phone number, credit card information, driver's license information, a social security number, biometric information, and a photograph may be requested/collected in steps 105-115. Driver's license information may be entered by swiping a driver's license with a magnetic stripe along a magnetic card reader as in step 105, or by manually inputting the pertinent information using a keypad, touch sensitive screen or other input device. Similarly, credit card information, if used, may be entered by swiping the card with a magnetic stripe along a magnetic card reader. Likewise, a social security number may be entered, as in step 110, using a keyboard, touch-sensitive screen or other user input device suitable for entering the data. Biometric information such as a thumbprint, fingerprint and/or retinal scan may be obtained using a suitably equipped scanner, as in step 115. By way of example and not limitation, a fingerprint scanner 445 may shine a light against the borrower's finger (e.g., thumb), the reflection being picked up by a CCD (charge-coupled device) camera. The image of the finger may then be processed by a controller, recording certain data points, called "minutiae", which describe the fingerprint layout. Additionally, the borrower may be digitally photographed, as in step 115, using the camera 455 of the ATM 400. The digital photograph may be associated with the other identification information and any ensuing transaction. In addition to, or in lieu of, biometric (e.g., fingerprint) identification, the borrower may be required to input a security code such as a personal identification number or password. The code may be assigned to or selected by the borrower as part of a pre-registration process.

After a borrower supplies the required data, the borrower's identification may be checked for approval, as in step 120. Any or all of the entered information may be compared with information in one or more databases to determine if the transaction should proceed. If, based upon the comparison, the entered information is incomplete, inconsistent, or reveals a potential unacceptable risk, the transaction may be rejected.

After processing and approving the identification information, the ATM prompts the borrower to apply for the check cashing transaction, as in step 125. This step may entail inputting information pertaining to the cash advance and required to complete the transaction. The application may also present the borrower with the terms and conditions applicable to the transaction.

Upon completing the application, relevant data may be presented to an underwriting module, as in step 127, to evaluate the application data, approve or deny the cash advance, and/or determine the loan amount. Underwriting entails credit analysis preceding the loan transaction, based on credit information furnished by the borrower, such as employment, salary, and financial data; the borrower's credit history, which may be detailed in a credit report; and the lender's evaluation of the borrower's credit needs and ability to pay. The invention is not limited to any particular method or system of underwriting. The underwriting module may be comprised of one or more hardware, software and/or firmware components residing on the ATM 400 and/or on one or more remote computer systems. In a preferred implementation, the underwriting step is fully automated performed according to programmed algorithms, requiring no human intervention. However, in alternative implementations the underwriting step may require or allow human intervention to monitor, facilitate, assist or perform the underwriting process.

Next, the borrower will be prompted to enter a check (e.g., a personal check), as in step 130. The check should be sufficient to cover the cash advance amount, plus all applicable charges and fees for the transaction. A check transport is adapted to receive the check and convey it to an imager for processing (i.e., imaging and voiding) as discussed below. The check transport is further adapted to return the check after processing.

Next, a database is scanned to determine if the borrower/payer has a history of fraud or passing dishonored checks due to insufficient funds, closed accounts or any other reason, as in step 135. A check verification module comprised of one or more hardware, software and/or firmware components residing on the ATM 400 and/or on one or more remote computer systems may send a request to a database for dishonored (e.g., insufficient fund, dishonored, etc.) checks. Such a database may include any available check payment history database such as the TeleCheck® database available through TeleCheck International, Inc., and/or the Shared Check Authorization Network® (SCAN) database available through Chex Systems, Inc. Comprised of data from retailers, banks and other contributors, such databases provide reports of historical information of dishonored checks due to insufficient funds and other reasons that can be used to make check acceptance decisions. By way of illustration and not limitation, if a report reveals any "RETURNED" or dishonored checks for a borrower, or if a report reveals "RETURNED" or dishonored checks within the past X years, the cash advance transaction may be denied.

If the transaction has been accepted (i.e., has not been denied), then a loan agreement will be presented and the customer will be prompted to expressly assent to the terms and conditions thereof, as in step 140. An exemplary loan agreement specifies terms and conditions used in cash advance transactions. Such terms and conditions may include the loan amount, fees, payment terms, send and hit dates for payment on the check, liabilities for breach, governing law, dispute resolution and miscellaneous terms. The loan agreement may be presented on a display screen 450 and/or printed using the ATM's printer 417. The borrower may expressly assent to the loan agreement by entering a signature using the signature pad 447, or by signing the printed agreement and depositing a copy in the ATM, or by some other manifestation of assent acceptable under the law of the applicable jurisdiction, such as by selecting an "I Accept" or similar icon.

An important aspect of an exemplary implementation of the invention is compatibility with the applicable law(s) governing payment effectuated using images of checks, such as compatibility with "Check 21". The Check Clearing for the 21st Century Act ("Check 21"), PL 108-100, was signed into U.S. law on Oct. 28, 2003, and became effective on Oct. 28, 2004. Check 21 is designed to foster innovation in payment systems and to enhance efficiency by reducing some of the legal impediments to check truncation. Truncation means removing an original check from the forward collection or return process and to send in lieu of the original check either a substitute check (as in the Check 21 process) or, by agreement, information relating to the original check (as in the ACH process). To facilitate check truncation and electronic check exchange, the Check 21 Act authorizes a new negotiable instrument called a "substitute check." A substitute check is a paper reproduction of the original check that contains an image of the front and back of the original check and can be processed just like the original check. The law facilitates check cashing by creating a new negotiable instrument called a substitute check, which permits banks to truncate original checks, to process check information electronically, and to deliver substitute checks to banks that want to continue receiving paper checks.

More specifically, Check 21 defines a "substitute check" as a paper reproduction of the original check that: contains an image of the front and back of the original check; bears a Magnetic Ink Character Recognition (MICR) line containing all the information appearing on the MICR line of the original check, except as provided under generally applicable industry standards for substitute checks to facilitate the processing of substitute checks; contains a legend stating that it is a legal equivalent of the original check; conforms, in paper stock, dimension and otherwise, with generally applicable industry standards for substitute checks; and is suitable for automated processing in the same manner as the original check.

An exemplary process according to principles of the invention produces check images and data that enable compliance with the requirements of law(s) pertaining to electronic check processing, such as images and data sufficient to produce substitute checks under Check 21.

Referring to step 145, the check is processed using an imager. The imager may be comprised of one or more optical scanners, preferably adapted to scan both sides of the check. Optionally, the check imager may further include magnetic ink character recognition (MICR) capability, to detect and read MICR characters on the check and store data representing such characters. The original check will then be voided by perforating, stamping, or printing, or a combination of some of these methods, or others with the same basic effect of being readily apparent to humans and machines. The loan agreement may be presented on a display screen 450 and/or printed using the ATM's printer 417.

As discussed above, in an exemplary implementation, the check image and related data are sufficient to produce a substitute check, which complies with the then-current requirements of applicable law (e.g., Check 21). Such image and data are referred to herein as an Electronic Payment Instrument.

Next, the ATM prints a copy of the loan agreement, using printer 417. The printed loan agreement may be retained by the borrower for the borrower's own records.

In a preferred implementation of a methodology according to principles of the invention, the loan amount is provided to the borrower in the form of a cash (debit) card, instead of cash. Accordingly, in step 150, a cash (debit) card is activated and associated with an account at a depository institution. The ATM causes an electronic transfer of funds from a lender account to the account at a depository institution established for the borrower's cash (debit) card. The borrower may access funds on cash (debit) cards through automated teller machines. In addition, a borrower can use the card as a debit card for merchant transactions. Thus, the cash (debit) card provides convenient and secure access to the advanced funds.

The invention is not limited payment with a cash (debit) card. In an alternative implementation, the loan amount may be provided to the borrower in cash. In another alternative embodiment, the borrower may have the option of transferring the borrowed funds to another account, such as the account of a third party payee. In yet another alternative implementation the borrower may be prompted for a form of disbursement from a group including payment in cash, payment by cash (debit) card, transfer to another account or to a third party payee.

After the card is activated and the corresponding account is funded, the cash (debit) card may be presented to the borrower, as in step 155. The ATM includes a card storage for storing a plurality of cash (debit) cards. The card storage is operably coupled to a transport, which is configured to deliver the card to a card dispenser 420. Activation may occur at the card storage or another station disposed between the card storage and card dispenser 420. The activation station is configured to write data to and/or read data from a storage medium (e.g., a magnetic stripe or computer chip) of the cash (debit) card.

To enable secure access to the account associated with the cash (debit) card, the ATM may require the borrower to input a security code such as personal identification number (PIN) and/or a password, as in step 160. A card reader is configured to read account identification data from an information source (e.g., magnetic stripe, smart chip or other data source) on the card. A PIN may be comprised of plurality of characters (e.g., four or more digits). Upon reading the account number and receiving the PIN, the system looks up the correct PIN based upon the account number and compares the looked-up PIN with the received PIN. If they match, then the user is granted access. If they do not match, then the user is not granted access. The ATM may require the borrower to input the security code a plurality of times (e.g., twice) to help ensure that it was entered correctly.

The ATM may be equipped to check and display balances in an account associated with a cash (debit) card. A card reader is configured to read account identification data from an information source (e.g., magnetic stripe, smart chip or other data source) on the card. The user identifies himself or herself by inserting the card with the magnetic stripe or smart-card chip that contains the account number. The user may then verify his or her identity by entering a passcode or PIN. Upon receiving the account number and PIN, the system looks up the correct PIN based upon the account number and compares the looked-up PIN with the received PIN. If they match, then the user is granted access. If they do not match, then the user is not granted access. The ATM uses the account identification data to access the account and obtain account information such as the account balance, debits and credits. The ATM may then present some or all of the retrieved account information to the user on printed receipt and/or display screen.

In steps 165, 170 & 175, the Electronic Payment Instrument is settled using any settlement step(s) suitable for settling deferred presentment check transactions. An exemplary settlement may entail presenting the Electronic Payment Instrument to the lender's bank for funds disbursement upon presentment, as in step 170, or routing the Electronic Payment Instrument through a processing agent (i.e., an intermediary), as in step 175. The intermediary may be the Federal Reserve Bank, a correspondent bank, a clearinghouse, a third party service provider or combinations of two or more of the foregoing. As is known in the art, regional branches of the Federal Reserve handle check processing for banks that hold accounts with them, and they charge a fee for their services. Thus, the lender's bank may go through the Federal Reserve to settle Electronic Payment Instruments and/or substitute checks produced therefrom with member banks. Correspondent banks and clearinghouses typically have arrangements with corresponding banks/members to exchange checks and payments. Thus, the lender may go through a correspondent bank or clearinghouse to settle Electronic Payment Instruments and/or substitute checks produced therefrom. Upon settlement, the lender's account is credited and the borrower's checking account is debited for the amount of the Electronic Payment Instrument.

In a preferred implementation, settlement is performed according to The Check Clearing for the 21st Century Act (or "Check 21 Act"), United States Public Law 108-100, which allows the recipient of a paper check to create a digital version, thereby eliminating the need for further handling of the physical document. Both sides of the paper check are scanned to produce digital images. If a paper document is still needed, these images may be inserted into "substitute checks" or image replacement documents (IRDs), i.e., documents containing a photo-reduced copy of the original checks, data and a MICR line. Individuals, businesses and financial institutions can work with either the digital images or a print reproduction.

For an electronic image of a check to be used according to principles of the invention, the check image must be of a compatible format and accompanied by data pertaining to the transaction, e.g., an account number, routing transit number (RTN), dollar amount and check number. In an exemplary implementation, the check image may be provided as part of one or more files formatted according to a compatible standard, such as ANSI X9.37 2003, a well-known standard within the banking industry promulgated by the American National Standards Institute (ANSI). Such a file format typically includes header records, detail records, and control records. Although the above describes one file format in accordance with ANSI X9.37, it is contemplated that a structure in accordance with different standards (open or proprietary, now known or hereafter developed) could be used without departing from the scope of the invention.

In an alternative implementation, settlement may be performed according to an ACH process. As is known in the art, the Automated Clearing House (ACH) is an electronic banking network that processes large volumes of both credit and debit transactions according to rules and regulations established by the National Automated Clearing House Association (NACHA) and the Federal Reserve (Fed). An ACH entry starts with a Receiver (e.g., borrower/user) authorizing an Originator (ATM) to issue ACH debit or credit to an account. In the case of payroll checks, typically an employer's authorization is required. If an employer's authorization is necessary, it may be obtained in advance of a transaction. If an employer's authorization is not required, ACH becomes a more viable option. Once all necessary authorization is acquired, the Originator then creates an ACH entry to be given to an Originating Depository Financial Institution (ODFI), e.g., a financial institution that does ACH origination. This ACH entry may then be sent to an ACH Operator (e.g., the FED) and passed on to the Receiving Depository Financial Institution (RDFI), where the Receiver's account may be issued either a credit or debit depending upon the ACH transaction. Thus, instead of communicating and processing a substitute check in accordance with Check 21, a method and system according to principles of the invention may generate and communicate the data necessary to debit or credit an account according to an ACH process.

Upon completing the settlement steps 165-175, a settlement code may be returned to the ATM. The ATM will then update and close out the borrower's account in one or more communicatively coupled databases, as in step 180. The transaction may also be reported to one or more credit reporting agencies. Thereafter, the process is completed 185.

As discussed above, the ATM 400 may display an initialization screen that requires a user to select a type of transaction, such as a check cashing or cash advance transaction. If a user selects a cash advance transaction, and it is the user's second cash advance through the system, then the exemplary process shown in FIG. 2 may be implemented.

Referring now to FIG. 2, a high-level flowchart of an exemplary "subsequent" cash advance process according to principles of the invention is shown. In general, an exemplary subsequent cash advance process according to principles of the invention commences with steps of obtaining identification information as in steps 205-215. By way of example and not limitation, the borrower's name, address, date of birth, phone number, credit card information, driver's license information 205, a social security number 210, biometric information 215, such as a fingerprint and a photograph may be requested/collected in steps 205-215, as discussed above for the process depicted in FIG. 1. However, because this is a subsequent transaction, the borrower's information may already be stored in a database accessible by the ATM 400. If the stored information is current (e.g., less than 90 days old) and there are no changes to the information (e.g., name, address, driver's license) the transaction may proceed using previously stored information, as in step 222. Otherwise, the information may be updated as in step 222. In addition to, or in lieu of, biometric (e.g., fingerprint) identification, the borrower may be required to input a security code such as a personal identification number or password. The code may be assigned to or selected by the borrower as part of a pre-registration process.

After a borrower supplies the required data, the borrower's identification may be checked for approval, as in step 220. Any or all of the entered information may be compared with information in one or more databases to determine if the transaction should proceed. If, based upon the comparison, the entered information is incomplete, inconsistent, or reveals a potential unacceptable risk, the transaction may be rejected.

After processing and approving the identification information, the ATM may prompt the borrower to apply for the check cashing transaction, as in step 225. This step may entail inputting information pertaining to the check cashing transaction and required to complete the transaction. The application may also present the borrower with the terms and conditions applicable to the transaction. This step may be skipped if a prior application is adequate for the current transaction.

Next, relevant data may be presented to an underwriting module, as in step 227, to evaluate the application data, approve or deny the cash advance, and/or determine the loan amount. Underwriting entails credit analysis preceding the loan transaction, based on credit information furnished by the borrower, such as employment, salary, and financial data; the borrower's credit history, which may be detailed in a credit report; and the lender's evaluation of the borrower's credit needs and ability to pay. The invention is not limited to any particular method or system of underwriting. The underwriting module may be comprised of one or more hardware, software and/or firmware components residing on the ATM 400 and/or on one or more remote computer systems. In a preferred implementation, the underwriting step is fully automated performed according to programmed algorithms, requiring no human intervention. However, in alternative implementations the underwriting step may require or allow human intervention to monitor, facilitate, assist or perform the underwriting process.

Next, the borrower will be prompted to enter a check (e.g., a personal check), as in step 230. The check should be sufficient to cover the cash advance amount, plus all accrued interest and applicable charges and fees for the transaction.

Next, a database is scanned to determine if the borrower/payer has a history of fraud or passing dishonored checks due to insufficient funds, closed accounts or any other reason, as in step 235. The check verification module comprised of one or more hardware, software and/or firmware components residing on the ATM 400 and/or on one or more remote computer systems may send a request to a database for dishonored (e.g., insufficient fund, closed account, etc.) checks. If a report reveals any "RETURNED" or dishonored checks for a borrower, or if a report reveals "RETURNED" or dishonored checks within the past X years, the cash advance transaction may be denied.

If the transaction has been accepted (i.e., has not been denied), then a loan agreement will be presented and the customer will be prompted to expressly assent to the terms and conditions thereof, as in step 240. The loan agreement may be presented on a display screen 450 and/or printed using the ATM's printer 417. The borrower may expressly assent to the loan agreement by entering a signature using the signature pad 447, or by signing the printed agreement and depositing a copy in the ATM, or by some other manifestation of assent acceptable under the law of the applicable jurisdiction, such as by selecting an "I Accept" or similar icon.

As with the process described above with reference to FIG. 1, an important aspect of an exemplary implementation of the process corresponding to FIG. 2 is Check 21 compatibility. Referring to step 245, the check is processed using an imager. The imager may be comprised of one or more optical scanners, preferably adapted to scan both sides of the check. Optionally, the check imager may further include magnetic ink character recognition (MICR) capability, to detect and read MICR characters on the check and store data representing such characters. The original check will then be voided by perforating, stamping, or printing, or a combination of some of these methods, or others with the same basic effect of being readily apparent to humans and machines. The voided check is then returned to the borrower. The loan agreement may be presented on a display screen 450 and/or printed using the ATM's printer 417.

The check image and related data comprise an Electronic Payment Instrument, which is sufficient to produce a substitute check in compliance with the then-current requirements of applicable law (e.g., Check 21).

Next, the ATM prints a copy of the loan agreement, using printer 417. The printed loan agreement may be retained by the borrower for the borrower's own records.

In a preferred implementation of a methodology according to principles of the invention, the loan amount is provided to the borrower in the form of a cash (debit) card, instead of cash. Accordingly, in step 250, a cash (debit) card is activated and associated with an account at a depository institution. The ATM causes an electronic transfer of funds from a lender account to the account at a depository institution established for the borrower's cash (debit) card. The borrower may access funds on cash (debit) cards through automated teller machines. In addition, a borrower can use the card as a debit card for merchant transactions. Thus, the cash (debit) card provides convenient and secure access to the advanced funds.

After the card is activated and the corresponding account is funded, the cash (debit) card may be presented to the borrower, as in step 255. The ATM includes a card storage for storing a plurality of cash (debit) cards. The card storage is operably coupled to a transport, which is configured to deliver the card to a card dispenser 420. Activation may occur at the card storage or another station disposed between the card storage and card dispenser 420. The activation station is configured to write data to and/or read data from a storage medium (e.g., a magnetic stripe or computer chip) of the cash (debit) card.

To enable secure access to the account associated with the cash (debit) card, the ATM may require the borrower to input a security code such as personal identification number and/or a password, as in step 260. The ATM may require the borrower to input the security code a plurality of times (e.g., twice) to help ensure that it was entered correctly.

The invention is not limited payment with a cash (debit) card. In an alternative implementation, the loan amount may be provided to the borrower in cash. In another alternative embodiment, the borrower may have the option of transferring the borrowed funds to another account, such as the account of a third party payee. In yet another alternative implementation the borrower may be prompted for a form of disbursement from a group including payment in cash, payment by cash (debit) card, transfer to another account or to a third party payee.

The ATM may be equipped to check and display balances in an account associated with a cash (debit) card. A card reader is configured to read account identification data from an information source (e.g., magnetic stripe, smart chip or other data source) on the card. The ATM uses the account identification data to access the account and obtain account information such as the account balance, debits and credits. The ATM may then present some or all of the retrieved account information to the user on printed receipt and/or display screen.

In steps 265, 270 & 275, the Electronic Payment Instrument is settled using any settlement step(s) suitable for settling deferred presentment check transactions. An exemplary settlement may entail presenting the Electronic Payment Instrument to the lender's bank for funds disbursement upon presentment, as in step 270, or routing the Electronic Payment Instrument through a processing agent (i.e., an intermediary), as in step 275. The intermediary may be the Federal Reserve Bank, a correspondent bank, a clearinghouse, a third party service provider, or a combination of two or more of the foregoing. As is known in the art, regional branches of the Federal Reserve handle check processing for banks that hold accounts with them, and they charge a fee for their services. Thus, the lender's bank may go through the Federal Reserve to settle Electronic Payment Instruments and/or substitute checks produced therefrom with a member banks. Correspondent banks and clearinghouses typically have arrangements with corresponding banks/members to exchange checks and payments. Thus, the lender may go through a correspondent bank or clearinghouse to settle Electronic Payment Instruments and/or substitute checks produced therefrom.

In a preferred implementation, settlement is performed according to The Check Clearing for the 21st Century Act (or "Check 21 Act"), United States Public Law 108-100, which allows the recipient of a paper check to create a digital version, thereby eliminating the need for further handling of the physical document. Both sides of the paper check are scanned to produce digital images. If a paper document is still needed, these images may be inserted into "substitute checks" or image replacement documents (IRDs), i.e., documents containing a photo-reduced copy of the original checks, data and a MICR line. Individuals, businesses and financial institutions can work with either the digital images or a print reproduction.

For an electronic image of a check to be used according to principles of the invention, the check image must be of a compatible format and accompanied by data pertaining to the transaction, e.g., an account number, routing transit number (RTN), dollar amount and check number. In an exemplary implementation, the check image may be provided as part of one or more files formatted according to a compatible standard, such as ANSI X9.37 2003, a well-known standard within the banking industry promulgated by the American National Standards Institute (ANSI). Such a file format typically includes header records, detail records, and control records. Although the above describes one file format in accordance with ANSI X9.37, it is contemplated that a structure in accordance with different standards (open or proprietary, now known or hereafter developed) could be used without departing from the scope of the invention.

In an alternative implementation, settlement may be performed according to an ACH process. As is known in the art, the Automated Clearing House (ACH) is an electronic banking network that processes large volumes of both credit and debit transactions according to rules and regulations established by the National Automated Clearing House Association (NACHA) and the Federal Reserve (Fed). An ACH entry starts with a Receiver (e.g., borrower/user) authorizing an Originator (ATM) to issue ACH debit or credit to an account. Once authorization is acquired, the Originator then creates an ACH entry to be given to an Originating Depository Financial Institution (ODFI), e.g., a financial institution that does ACH origination. This ACH entry may then be sent to an ACH Operator (e.g., the FED) and passed on to the Receiving Depository Financial Institution (RDFI), where the Receiver's account may be issued either a credit or debit depending upon the ACH transaction. Thus, instead of communicating and processing a substitute check in accordance with Check 21, a method and system according to principles of the invention may generate and communicate the data necessary to debit or credit an account according to an ACH process.

Upon settlement, the lender's account is credited and the borrower's checking account is debited for the amount of the Electronic Payment Instrument. Upon completing the settlement steps 265-275, a settlement code may be returned to the ATM. The ATM will then update and close out the borrower's account in one or more communicatively coupled databases, as in step 280. The transaction may also be reported to one or more credit reporting agencies. Thereafter, the process is completed 285.

As discussed above, the ATM 400 may display an initialization screen that requires a user to select a type of transaction, such as a check cashing or cash advance transaction. If a user selects a check cashing transaction, then the exemplary process shown in FIG. 3 may be implemented.

Referring now to FIG. 3, a high-level flowchart of an exemplary check cashing process according to principles of the invention is shown. In general, an exemplary check cashing process according to principles of the invention commences with steps of obtaining identification information as in steps 305-315. By way of example and not limitation, the payee's name, address, date of birth, phone number, credit card information, driver's license information 305, a social security number 310, biometric information 315, such as a thumbprint and photograph, may be requested/collected in steps 305-315, as discussed above for the process depicted in FIG. 1.

After a payee supplies the required data, the payee's identification may be checked for approval, as in steps 320. Any or all of the entered information may be compared with information in one or more databases to determine if the transaction should proceed. If, based upon the comparison, the entered information is incomplete, inconsistent, or reveals a potential unacceptable risk, the transaction may be rejected.

After processing and approving the identification information, the ATM may prompt the payee to apply for the check cashing transaction, as in step 325. This step may entail inputting information pertaining to the check and required to complete the transaction, such as payer in formation. The application may also present the payee with the terms and conditions applicable to the transaction. This step may be skipped if a prior application is adequate for the current transaction.

Next, relevant data may be presented to an underwriting module, as in step 327, to evaluate the application data, approve or deny the check cashing transaction. The invention is not limited to any particular method or system of underwriting. The underwriting module may be comprised of one or more hardware, software and/or firmware components residing on the ATM 400 and/or on one or more remote computer systems. In a preferred implementation, the underwriting step is fully automated, requiring no human intervention. However, in alternative implementations the underwriting step may require or allow human intervention to monitor, facilitate, assist or perform the underwriting process.

Next, the payee will be prompted to enter a check (e.g., a payroll check), as in step 330. The check should be sufficient to cover the check cashing transaction amount, plus all accrued interest and applicable charges and fees for the transaction.

Next, a database is scanned to determine if the payee/payer on the check has a history of fraud or passing dishonored checks due to insufficient funds, closed accounts or any other reason, as in step 335. The check verification module comprised of one or more hardware, software and/or firmware components residing on the ATM 400 and/or on one or more remote computer systems may send a request to a database for dishonored (e.g., insufficient fund, closed account, etc.) checks. If a report reveals any "RETURNED" or dishonored checks for a payer, or if a report reveals "RETURNED" or dishonored checks within the past X years, the check cashing transaction may be denied.

If the transaction has been accepted (i.e., has not been denied), then the check cashing fees will be presented and the customer will be prompted to expressly accept the fees, as in step 340. The check cashing fees may be presented on a display screen 450. The payee may expressly assent to the check cashing fees by any manifestation of assent acceptable under the law of the applicable jurisdiction, such as by selecting an "I Accept" or similar icon.

As with the process described above with reference to FIG. 1, an important aspect of an exemplary implementation of the process corresponding to FIG. 2 is Check 21 compatibility. Referring to step 345, the check is processed using an imager. The imager may be comprised of one or more optical scanners, preferably adapted to scan both sides of the check. Optionally, the check imager may further include magnetic ink character recognition (MICR) capability, to detect and read MICR characters on the check and store data representing such characters. The original check will then be voided by perforating, stamping, or printing, or a combination of some of these methods, or others with the same basic effect of being readily apparent to humans and machines. The check cashing fees may be presented on a display screen 450 and/or printed using the ATM's printer 417.

The check image and related data comprise an Electronic Payment Instrument, which is sufficient to produce a substitute check in compliance with the then-current requirements of Check 21.

In a preferred implementation of a methodology according to principles of the invention, the cashed check amount less any fees and taxes is provided to the payee in the form of a cash (debit) card, instead of cash. Accordingly, in step 355, a cash (debit) card is activated and associated with an account at a depository institution. The ATM causes an electronic transfer of funds from a lender account to the account at a depository institution established for the payee's cash (debit) card. The payee may access funds on cash (debit) cards through automated teller machines. In addition, a payee can use the card as a debit card for merchant transactions. Thus, the cash (debit) card provides convenient and secure access to the funds.

After the card is activated and the corresponding account is funded, the cash (debit) card may be presented to the payee, as in step 355. The ATM includes a card storage for storing a plurality of cash (debit) cards. The card storage is operably coupled to a transport, which is configured to deliver the card to a card dispenser 420. Activation may occur at the card storage or another station disposed between the card storage and card dispenser 420. The activation station is configured to write data to and/or read data from a storage medium (e.g., a magnetic stripe or computer chip) of the cash (debit) card.

To enable secure access to the account associated with the cash (debit) card, the ATM may require the payee to input a security code such as personal identification number and/or a password, as in step 360. The ATM may require the payee to input the security code a plurality of times (e.g., twice) to help ensure that it was entered correctly.

In steps 365, 370 & 375, the Electronic Payment Instrument is settled. Settlement may entail either presenting the Electronic Payment Instrument to the lender's bank for funds disbursement upon presentment, as in step 370, or routing the Electronic Payment Instrument through a processing agent (i.e., an intermediary). The intermediary may be the Federal Reserve Bank, a correspondent bank, or a clearinghouse. As is known in the art, regional branches of the Federal Reserve handle check processing for banks that hold accounts with them, and they charge a fee for their services. Thus, the lender's bank may go through the Federal Reserve to settle Electronic Payment Instruments and/or substitute checks produced therefrom with a member banks. Correspondent banks and clearinghouses typically have arrangements with corresponding banks/members to exchange checks and payments. Thus, the lender may go through a correspondent bank or clearinghouse to settle Electronic Payment Instruments and/or substitute checks produced therefrom.

Upon settlement, the payee's account is credited for an amount equal to the cashed check amount, less applicable fees and taxes for the service, and the payer's checking account is debited for the amount of the Electronic Payment Instrument. The ATM service provider receives the fees and taxes for the service. Upon completing the settlement steps 365-375, a settlement code may be returned to the ATM. The ATM will then update and close out the payee's account in one or more communicatively coupled databases, as in step 380. The transaction may also be reported to one or more credit reporting agencies. Thereafter, the process is completed 385.

While the invention has been described in terms of various embodiments and implementations, those skilled in the art will recognize that the invention can be practiced with modification within the spirit and scope of the appended claims. The invention is not limited to the exemplary steps and components described above. The selection, arrangement and configuration of components, and the selection and order of steps may be varied within the scope of the invention.

What is claimed is:

1. An automated method for processing a check financial transaction using a computing system communicatively coupled to a computer network, said computing system including a scanner, and said method comprising:

obtaining application information from a customer via the computing system;

receiving an original check for payment of a first amount;

producing check data from the original check using the scanner, said original check having a front and a back;

accessing a creditworthiness database to obtain customer creditworthiness information for the check financial transaction;

communicating application information and customer creditworthiness information to an underwriting module configured to determine whether to approve the check financial transaction;

if the check financial transaction is approved, voiding the original check;

if the check financial transaction is approved, providing a second amount to the customer, said second amount being an amount less than the first amount, a difference between the second amount and the first amount including a transaction fee; and if the check financial transaction is approved, communicating the check data, including the first amount, to a remote settlement system configured to settle the check financial transaction; and wherein said check data includes data for producing a substitute check, said data for producing the substitute check including data for an image of the front of the original check and data for an image of the back of the original check.

2. An automated method for processing a check financial transaction using a computing system communicatively coupled to a computer network according to claim 1, wherein the step of communicating the check data to a remote settlement system configured to settle the transaction, includes communicating the check data to a remote settlement system configured to settle the transaction on a determined future date.

3. An automated method for processing a check financial transaction using a computing system communicatively coupled to a computer network according to claim 1, wherein the computing system includes a financial card supply and activation subsystem and the method includes a step of providing a second amount to the customer that includes opening an account for the second amount, funding the account with the second amount, producing a financial card for transacting with the account and providing the financial card to the customer via the computing system.

4. An automated method for processing a check financial transaction using a computing system communicatively coupled to a computer network according to claim 1, wherein the data for the image of the front of the original check and data for the image of the back of the original check includes data corresponding to a scanned image of the front and back of the original check.

5. An automated method for processing a check financial transaction using a computing system communicatively coupled to a computer network according to claim 1, wherein the application information from the customer includes at least one datum from the group consisting of name, address, date of birth, phone number, credit card information, driver's license information, social security number, biometric information, and a photograph.

6. An automated method for processing a check financial transaction using a computing system communicatively coupled to a computer network according to claim 2, wherein the computing system includes a biometric scanner and the application information includes biometric information obtained using the biometric scanner.

7. An automated method for processing a check financial transaction using a computing system communicatively coupled to a computer network according to claim 1, wherein the computing system is equipped with a camera and the application information includes a digital photograph of the customer, said digital photograph being produced by the computing system.

8. An automated method for processing a check financial transaction using a computing system communicatively coupled to a computer network according to claim 1, further comprising a step of accessing a remote database to compare the application information obtained from the customer with information for the customer in the remote database.

9. An automated method for processing a check financial transaction using a computing system communicatively coupled to a computer network according to claim 1, wherein the step of accessing a creditworthiness database to obtain customer creditworthiness information and determine if the customer poses an unacceptable credit risk includes accessing a remote credit reporting database to obtain a credit score.

10. An automated method for processing a check financial transaction using a computing system communicatively coupled to a computer network according to claim 1, wherein the step of accessing a creditworthiness database to obtain customer creditworthiness information and determine if the customer poses an unacceptable credit risk includes accessing a check payment history database to determine if the customer has passed dishonored checks.

11. An automated method for processing a check financial transaction using a computing system communicatively coupled to a computer network according to claim 1, further comprising a step of presenting the customer with a legally binding agreement applicable to the transaction and requiring the customer to indicate acceptance of the legally binding agreement as a condition for proceeding with the transaction.

12. An automated method for processing a check financial transaction using a computing system communicatively coupled to a computer network according to claim 1, wherein the data for an image of the front of the original check and data for an image of the back of the original check comprise data corresponding to a scanned image of the front and back of the original check, and the check data further comprises an account number for the original check, a routing transit number for the original check, an amount for the original check and a check number for the original check.

13. An automated method for processing a check financial transaction using a computing system communicatively coupled to a computer network according to claim 1, wherein the step of communicating the check data to a remote settlement system configured to settle the transaction includes communicating the check data to a financial institution for electronic disbursement of funds to a determined service provider account upon receipt of the check data by the financial institution.

14. An automated method for processing a check financial transaction using a computing system communicatively coupled to a computer network according to claim 2, wherein the step of communicating the check data to a remote settlement system configured to settle the transaction includes communicating the check data to a financial institution for electronic disbursement of funds on a future date to a determined service provider account upon receipt of the check data by the financial institution.

15. An automated method for processing a check financial transaction using a computing system communicatively coupled to a computer network according to claim 14, wherein the original check includes a front, a back and a magnetic ink character recognition line displaying information, and the step of communicating the check data to a remote settlement system includes communicating data for producing a substitute for the original check, said substitute including an image of the front and back of the original check, and a magnetic ink character recognition line displaying the information on the magnetic ink character recognition line of the original check, and a legend stating that it is a legal equivalent of the original check; and delivering the substitute to the remote settlement system.

16. An automated method for processing a check financial transaction using a computing system communicatively coupled to a computer network according to claim 2, wherein the step of communicating the check data to a remote settlement system configured to settle the transaction includes creating an ACH entry to be given to an originating depository financial institution for sending to a receiving depository financial institution through an ACH operator.

17. An automated method for processing a check financial transaction using a computing system communicatively coupled to a computer network according to claim 2, wherein the check data comprises at least one file.

18. An automated method for processing a check financial transaction using a computing system communicatively coupled to a computer network according to claim 2, wherein the step of voiding the original check and returning the voided original check to the customer includes voiding the original check using the computing system by performing an action from the group consisting of perforating the check, mutilating the check, stamping a void indication on the check, and printing a void indication on the check.

19. An automated method for processing a check financial transaction using a computing system communicatively coupled to a computer network according to claim 2, wherein the step of providing a second amount to the customer, said second amount being less than the first amount, includes providing to the customer an activated financial card associated with an account at a depository institution, said account being funded with the second amount.

20. An automated method for processing a check financial transaction using a computing system communicatively coupled to a computer network according to claim 2, wherein the step of providing a second amount to the customer, said second amount being less than the first amount, includes a step from the group consisting of:

providing to the customer an activated financial card associated with an account at a depository institution, said account being funded with the second amount;

providing an amount of cash equal to the second amount to the customer; and     transferring the second amount to an account specified by the customer.

\* \* \* \* \*